United States Patent
de Montmorillon et al.

(10) Patent No.: US 10,295,733 B2
(45) Date of Patent: May 21, 2019

(54) SINGLE MODE FIBRE WITH A TRAPEZOID CORE, SHOWING REDUCED LOSSES

(71) Applicant: Draka Comteq B.V., Amsterdam (NL)

(72) Inventors: Louis-Anne de Montmorillon, Versailles (FR); Pierre Sillard, Le Chesnay (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 15/105,767

(22) PCT Filed: Dec. 20, 2013

(86) PCT No.: PCT/IB2013/002955
§ 371 (c)(1),
(2) Date: Jun. 17, 2016

(87) PCT Pub. No.: WO2015/092464
PCT Pub. Date: Jun. 25, 2015

(65) Prior Publication Data
US 2017/0031089 A1 Feb. 2, 2017

(51) Int. Cl.
*G02B 6/02* (2006.01)
*G02B 6/028* (2006.01)
*G02B 6/036* (2006.01)

(52) U.S. Cl.
CPC ......... *G02B 6/0281* (2013.01); *G02B 6/0365* (2013.01); *G02B 6/03633* (2013.01)

(58) Field of Classification Search
CPC ............... G02B 6/0281; G02B 6/03633
See application file for complete search history.

(56) References Cited

U.S. PATENT DOCUMENTS

| | | | | |
|---|---|---|---|---|
| RE30,635 E | * | 6/1981 | Kuppers | C03B 37/0183 138/145 |
| 4,314,833 A | * | 2/1982 | Kuppers | C03B 37/01861 427/575 |
| 4,516,826 A | * | 5/1985 | Paek | G02B 6/0281 385/124 |

(Continued)

FOREIGN PATENT DOCUMENTS

| | | |
|---|---|---|
| CN | 101688946 A | 3/2010 |
| CN | 102116897 A | 7/2011 |

(Continued)

OTHER PUBLICATIONS

International Preliminary Report on Patentability in counterpart International Application No. PCT/IB2013/002955, dated Jun. 21, 2016, pp. 1-6.

(Continued)

*Primary Examiner* — Peter Radowski
(74) *Attorney, Agent, or Firm* — Additon, Higgins & Pendleton, P.A.

(57) ABSTRACT

The invention concerns a single mode optical fiber having a core and a cladding, the core refractive index profile having a trapezoid-like shape. According to an aspect of the invention, the transition part of the trapezoid-like core refractive index profile is obtained by gradually changing a concentration of at least two dopants from a concentration in said center part of said core to a concentration in a cladding part adjacent to said core.

20 Claims, 3 Drawing Sheets

(56) References Cited

U.S. PATENT DOCUMENTS

| | | | | |
|---|---|---|---|---|
| 4,755,022 A * | 7/1988 | Ohashi | G02B 6/03633 | 385/124 |
| 4,852,968 A * | 8/1989 | Reed | G02B 6/02238 | 250/227.28 |
| 6,529,666 B1 * | 3/2003 | Dultz | G02B 6/02228 | 385/127 |
| 6,625,360 B2 * | 9/2003 | Kyogoku | G02B 6/02 | 385/123 |
| 6,771,865 B2 * | 8/2004 | Blaszyk | G02B 6/2835 | 385/127 |
| 6,879,764 B2 * | 4/2005 | Changdar | G02B 6/02242 | 385/123 |
| 7,171,090 B2 * | 1/2007 | Mattingly, III | G02B 6/0281 | 385/123 |
| 7,356,234 B2 * | 4/2008 | de Montmorillon | G02B 6/02014 | 385/123 |
| 7,366,387 B2 * | 4/2008 | Matsuo | G02B 6/02 | 385/123 |
| 7,483,613 B2 * | 1/2009 | Bigot-Astruc | H04B 10/25253 | 385/123 |
| 7,555,186 B2 * | 6/2009 | Flammer | G02B 6/0365 | 385/127 |
| 7,555,187 B2 | 6/2009 | Bickham et al. | | |
| 7,702,204 B2 * | 4/2010 | Gonnet | C03B 37/01291 | 385/123 |
| 7,876,990 B1 * | 1/2011 | Mishra | C03B 37/02718 | 385/123 |
| 7,889,960 B2 * | 2/2011 | de Montmorillon | G02B 6/0365 | 385/127 |
| 7,894,698 B2 * | 2/2011 | Flammer | G02B 6/03694 | 385/127 |
| 8,009,950 B2 * | 8/2011 | Molin | G02B 6/0288 | 385/124 |
| 8,041,172 B2 * | 10/2011 | Sillard | G02B 6/02019 | 385/124 |
| 8,055,111 B2 * | 11/2011 | Sillard | G02B 6/03661 | 385/123 |
| 8,131,125 B2 * | 3/2012 | de Montmorillon | G02B 6/0365 | 385/127 |
| 8,145,025 B2 * | 3/2012 | de Montmorillon | G02B 6/0365 | 385/123 |
| 8,145,027 B2 * | 3/2012 | Overton | C03C 13/046 | 385/126 |
| 8,259,389 B2 * | 9/2012 | Pastouret | B82Y 30/00 | 359/341.1 |
| 8,265,439 B2 * | 9/2012 | Gonnet | C03B 37/01291 | 382/124 |
| 8,265,440 B2 * | 9/2012 | Gonnet | C03B 37/01291 | 385/123 |
| 8,280,213 B2 * | 10/2012 | Molin | G02B 6/0288 | 385/123 |
| 8,290,324 B2 * | 10/2012 | Sillard | G02B 6/02019 | 385/126 |
| 8,301,000 B2 * | 10/2012 | Sillard | G02B 6/02019 | 385/126 |
| 8,340,488 B2 * | 12/2012 | Molin | G02B 6/0288 | 385/124 |
| 8,385,704 B2 * | 2/2013 | Molin | G02B 6/0365 | 385/123 |
| 8,385,705 B2 * | 2/2013 | Overton | C03C 13/046 | 385/126 |
| 8,391,661 B2 * | 3/2013 | Molin | G02B 6/0288 | 385/124 |
| 8,406,593 B2 * | 3/2013 | Molin | G02B 6/0288 | 385/124 |
| 8,428,410 B2 * | 4/2013 | Molin | G02B 6/0288 | 385/124 |
| 8,428,411 B2 * | 4/2013 | de Montmorillon | G02B 6/0281 | 385/124 |
| 8,428,414 B2 * | 4/2013 | de Montmorillon | G02B 6/0365 | 385/123 |
| 8,483,535 B2 * | 7/2013 | Molin | G02B 6/0288 | 385/126 |
| 8,520,993 B2 * | 8/2013 | Molin | G02B 6/0288 | 385/124 |
| 8,565,568 B2 * | 10/2013 | Bigot-Astruc | G02B 6/0288 | 385/126 |
| 8,639,079 B2 * | 1/2014 | Molin | G02B 6/0281 | 385/123 |
| 8,644,664 B2 * | 2/2014 | Molin | G02B 6/0281 | 385/124 |
| 8,666,214 B2 | 3/2014 | Bookbinder et al. | | |
| 8,676,015 B2 * | 3/2014 | Sillard | G02B 6/02009 | 264/1.24 |
| 8,724,950 B2 * | 5/2014 | Molin | G02B 6/0288 | 385/124 |
| 8,798,423 B2 * | 8/2014 | Sillard | G02B 6/03666 | 385/127 |
| 8,798,424 B2 * | 8/2014 | Bigot-Astruc | G02B 6/03666 | 385/123 |
| 8,867,879 B2 * | 10/2014 | Bigot-Astruc | G02B 6/02019 | 385/123 |
| 8,867,880 B2 * | 10/2014 | Molin | G02B 6/0288 | 385/124 |
| 8,879,878 B2 * | 11/2014 | Bigot-Astruc | G02B 6/0288 | 385/126 |
| 8,891,074 B2 * | 11/2014 | Molin | G01M 11/088 | 356/73.1 |
| 8,983,260 B2 * | 3/2015 | Sillard | G02B 6/02019 | 264/1.24 |
| 9,014,525 B2 * | 4/2015 | Molin | G02B 6/03627 | 385/127 |
| 9,067,816 B2 * | 6/2015 | Milicevic | C03B 37/0183 | |
| 9,162,917 B2 * | 10/2015 | Burov | C03B 37/01211 | |
| 9,341,771 B2 * | 5/2016 | Molin | G02B 6/0281 | |
| 9,405,062 B2 * | 8/2016 | Krabshuis | G02B 6/0281 | |
| 2003/0063878 A1 * | 4/2003 | Matsuo | C03B 37/01228 | 385/123 |
| 2003/0223717 A1 * | 12/2003 | Blaszyk | G02B 6/2835 | 385/127 |
| 2004/0197063 A1 * | 10/2004 | Changdar | G02B 6/02242 | 385/127 |
| 2007/0258686 A1 * | 11/2007 | De Montmorillon | G02B 6/02014 | 385/127 |
| 2008/0031582 A1 * | 2/2008 | Gonnet | C03B 37/01291 | 385/127 |
| 2008/0107426 A1 * | 5/2008 | Bigot-Astruc | H04B 10/25253 | 398/159 |
| 2008/0152288 A1 * | 6/2008 | Flammer | G02B 6/0365 | 385/124 |
| 2009/0252469 A1 * | 10/2009 | Sillard | G02B 6/03661 | 385/127 |
| 2009/0263092 A1 * | 10/2009 | Flammer | G02B 6/0365 | 385/127 |
| 2009/0279835 A1 * | 11/2009 | de Montmorillon | G02B 6/0365 | 385/127 |
| 2009/0279836 A1 * | 11/2009 | de Montmorillon | G02B 6/0365 | 385/127 |
| 2010/0118388 A1 * | 5/2010 | Pastouret | B82Y 30/00 | 359/341.5 |
| 2010/0189399 A1 * | 7/2010 | Sillard | G02B 6/02019 | 385/126 |
| 2010/0189400 A1 * | 7/2010 | Sillard | G02B 6/02019 | 385/127 |
| 2010/0254653 A1 * | 10/2010 | Molin | G02B 6/0288 | 385/28 |
| 2010/0290781 A1 * | 11/2010 | Overton | C03C 13/046 | 398/43 |

(56) References Cited

U.S. PATENT DOCUMENTS

| | | | | |
|---|---|---|---|---|
| 2010/0310218 A1* | 12/2010 | Molin | G02B 6/03627 | 385/123 |
| 2011/0044595 A1* | 2/2011 | Sillard | G02B 6/02019 | 385/124 |
| 2011/0058781 A1* | 3/2011 | Molin | G02B 6/0288 | 385/126 |
| 2011/0064367 A1* | 3/2011 | Molin | G02B 6/0288 | 385/100 |
| 2011/0123161 A1* | 5/2011 | Molin | G02B 6/0365 | 385/124 |
| 2011/0123162 A1* | 5/2011 | Molin | G02B 6/0288 | 385/124 |
| 2011/0135262 A1* | 6/2011 | Molin | G02B 6/0288 | 385/124 |
| 2011/0135263 A1* | 6/2011 | Molin | G02B 6/0288 | 385/124 |
| 2011/0188823 A1* | 8/2011 | Sillard | G02B 6/02009 | 385/123 |
| 2011/0188826 A1* | 8/2011 | Sillard | G02B 6/02019 | 385/127 |
| 2011/0217012 A1* | 9/2011 | Bigot-Astruc | G02B 6/0288 | 385/127 |
| 2011/0229101 A1* | 9/2011 | de Montmorillon | G02B 6/0281 | 385/124 |
| 2011/0305423 A1* | 12/2011 | Molin | G02B 6/03627 | 385/124 |
| 2012/0040184 A1* | 2/2012 | de Montmorillon | C03B 37/01211 | 428/376 |
| 2012/0051703 A1* | 3/2012 | Bigot-Astruc | G02B 6/02019 | 385/124 |
| 2012/0092651 A1* | 4/2012 | Molin | G01M 11/088 | 356/73.1 |
| 2012/0189258 A1* | 7/2012 | Overton | C03C 13/046 | 385/124 |
| 2012/0195549 A1* | 8/2012 | Molin | G02B 6/0281 | 385/28 |
| 2012/0195561 A1* | 8/2012 | Molin | G02B 6/0288 | 385/124 |
| 2012/0224254 A1* | 9/2012 | Burov | C03B 37/01211 | 359/341.5 |
| 2012/0243843 A1* | 9/2012 | Molin | G02B 6/0281 | 385/124 |
| 2012/0251062 A1* | 10/2012 | Molin | G02B 6/0281 | 385/124 |
| 2012/0275751 A1* | 11/2012 | Krabshuis | G02B 6/0281 | 385/126 |
| 2012/0301093 A1* | 11/2012 | Sillard | G02B 6/03666 | 385/126 |
| 2012/0315006 A1* | 12/2012 | Bigot-Astruc | G02B 6/03666 | 385/126 |
| 2013/0004135 A1* | 1/2013 | Bigot-Astruc | G02B 6/0288 | 385/126 |
| 2013/0028564 A1* | 1/2013 | Molin | G02B 6/03627 | 385/124 |
| 2013/0114935 A1* | 5/2013 | Bookbinder | G02B 6/0288 | 385/124 |
| 2013/0279868 A1* | 10/2013 | Zhang | G02B 6/02 | 385/127 |

FOREIGN PATENT DOCUMENTS

| | | | | |
|---|---|---|---|---|
| CN | 102819063 A | 12/2012 | | |
| CN | 102854563 A | 1/2013 | | |
| CN | 104169761 A | 11/2014 | | |
| CN | 102798927 A | 4/2016 | | |
| EP | 2369379 A1 | 9/2011 | | |
| JP | 09048629 A | * | 2/1997 | C03B 37/014 |
| JP | 09218319 A | * | 8/1997 | C03B 37/01228 |
| JP | 2003-104751 A | 4/2003 | | |
| WO | 02/27367 A1 | 4/2002 | | |
| WO | WO 0227367 A1 | * | 4/2002 | G02B 6/02271 |
| WO | 2013/066964 A1 | 5/2013 | | |
| WO | 2015/092464 A1 | 6/2015 | | |

OTHER PUBLICATIONS

International Search Report in counterpart International Application No. PCT/IB2013/002955 dated Oct. 8, 2014, pp. 1-2.
Tsujikawa et al., "Rayleigh Scattering Reduction Method for Silica-Based Optical Fiber", Journal of Lightwave Technology, vol. 18, No. 11, Nov. 2000, pp.
Hermann et al., "Refractive Index of Doped and Undoped PCVD Bulk Silica", Mat. Res. Bull., vol. 24, pp. 1083-1097, 1989.
Office Action in counterpart Japanese Application No. 2016-541165 dated Aug. 24, 2017, pp. 1-3.
Office Action in counterpart Chinese Application No. 201380081786.8 dated Aug. 2, 2018, pp. 1-6.

* cited by examiner

– – – – –

SINGLE MODE FIBRE WITH A TRAPEZOID CORE, SHOWING REDUCED LOSSES

1. FIELD OF THE INVENTION

The invention relates to single-mode optical fibres used in optical transmission systems, optical transmission systems comprising such single mode fibres, and fabrication methods thereof.

More specifically, the present invention relates to single-mode optical fibres having reduced scattering losses.

2. BACKGROUND

Telecommunication systems require optical fibre, which is capable of transmitting signals for a long distance without degradation. Such optical-fibre transmission systems often use single-mode optical fibres (SMFs), such as, for example, so-called "standard" single-mode fibres (SSMFs), which are used in terrestrial transmission systems.

To facilitate compatibility between optical systems from different manufacturers, the International Telecommunication Union (ITU) has defined several standards with which a standard optical transmission fibre should comply. Among these standards, the ITU-T G. 652 recommendation (November 2009) has several attributes (i.e. A, B, C and D) defining the fibre attributes of a single mode optical fibre with step-index profile. The ITU-T G. 657 recommendation focuses more precisely on bend insensitive single mode fibres.

As can be easily understood, loss is the key parameter for assessing the performance of such single-mode fibres, and any solution enabling reducing losses by 0.001 dB/km at the 1550 nm wavelength will significantly improve such single-mode fibres, as long as the other technical attributes and the manufacturing cost of the fibres are kept roughly the same. Actually, typical losses at the 1550 nm wavelength for a standard step-index single mode fibre are 0.19 dB/km, such that reducing losses by 0.001 dB/km would induce a −0.5% loss improvement.

It is well known that, for such single mode fibres, about 90% of the losses are due to the Rayleigh scattering at 1550 nm. The remaining 10% cover, on the one hand, losses induced by absorption mechanisms (OH-peak, Infrared losses, Ultraviolet losses) and, on the other hand, losses induced by an extra scattering mechanism, such as SAS ("Small Angle Scattering") described in patent document U.S. Pat. No. 7,171,090.

It is also well known that sharp index profile transitions induce such extra scattering losses. As an example, G. 652 step index profile, which presents a core index step of about $5 \times 10^{-3}$, induces extra scattering in the order of a few thousandth of dB/km (circa 0.005 dB/km) at the 1550 nm wavelength.

Actually, it must be recalled that an optical fiber is conventionally constituted of an optical core, which transmits an optical signal, and of an optical cladding, which confines the optical signal within the optical core. To that end the refractive index of the core, $n_c$, is greater than the one of the cladding, $n_{Cl}$. An optical fiber is generally characterized by a refractive index profile that associates the refractive index (n) with the radius (r) of the optical fiber: the distance r with respect to the center of the optical fiber is shown on x-axis and the difference Δn between the refractive index at radius r, n(r), and the refractive index of the optical cladding $n_{Cl}$ is shown on y-axis. Step index single mode fibres show a sharp index profile transition between the core and the cladding.

Designing core profiles having smoothed index transition has hence been investigated in the past, in an attempt to limit extra losses.

Patent document U.S. Pat. No. 7,171,090 hence describes an optical waveguide fibre designed with a soft transition of the index profile from the core to the cladding, which has low attenuation and low small angle scattering (SAS), at least in part due to a low-alpha profile (i.e., alpha less than 2.5). Actually, the low-alpha profiles produce a gradual change of refractive index, which contributes to decreased loss due to Small Angle Scattering (SAS).

Patent document U.S. Pat. No. 6,625,360 also describes single-mode optical fibres having an interfacial region between the core and the cladding with adequate index change, enabling achieving low loss phototransmission.

G. 652 single-mode fibres with alpha shape core profiles are also described in EP 2 369 379 and U.S. Pat. No. 7,876,990 patent documents. Although such an alpha profile allows a soft transition of the refractive index from the core to the cladding, it is not easy to control in the manufacturing process of a single mode fibre, such as a G. 652 SMF with a core diameter of circa 10 μm (hence much smaller than the core diameter of multimode fibres (50 μm or 62.5 μm), which often use alpha-graded index profiles).

It would hence be desirable to design a single mode optical fibre showing improvements over the prior art.

More precisely, it would be desirable to design a single mode optical fibre, which is easy to manufacture, and in which scattering losses due to index changes are reduced, without degrading Rayleigh scattering.

3. SUMMARY

In one particular embodiment of the invention, a single mode optical fibre having a core and a cladding is proposed, the core refractive index profile having the shape of a trapezoid. The transition part of the trapezoid-like core refractive index profile is obtained by gradually changing a concentration of at least two dopants from a concentration in said centre part of said core to a concentration in a cladding part adjacent to said core.

Thus, the invention relies on a novel and inventive approach of designing single mode fibres with soft transition of the index profile from the core to the cladding. Actually, a single mode optical fibre according to an embodiment of the invention has a core with a refractive index profile showing a trapezoid shape, instead of the more usual step shape. Such a trapezoid shape allows reducing the extra scattering losses in the single mode optical fibre, without degrading Rayleigh scattering. Moreover, such a trapezoid shape is easier to manufacture, as compared to the alpha-shaped refractive index profile from the prior art, which is not adequate for the small core diameter of single mode optical fibres.

Such a trapezoid shape is achieved through a gradual change in the concentration of two or more dopants in the transition part from the centre part of the core to the cladding. Such a careful design of the core allows achieving the same optical characteristics (such as Mode Field Diameter, Cable Cut-Off Wavelength and chromatic dispersion), as for an equivalent step-index single mode optical fibre.

In a first embodiment of the present invention, the cladding comprises at least one region of depressed refractive index, called a trench.

In another embodiment of the present invention, the single mode optical fibre is such that:

the centre part of said core has a radius $r_0$ and a refractive index $n_0$;

the transition part ranges from radius $r_0$ to a radius $r_1 > r_0$; and the cladding comprises:

an intermediate cladding ranging from radius $r_1$ to radius $r_2 > r_1$ and having a refractive index $n_2$;

a trench ranging from radius $r_2$ to radius $r_3 > r_2$ and having a refractive index $n_3$;

an outer cladding ranging from radius $r_3$ and having a refractive index $n_4$.

In yet another embodiment of the present invention, a ratio $r_0/r_1$ of said centre part of said core's radius $r_0$ to said transition part's radius $r_1$ is between about 0.25 and 0.75.

In yet another embodiment of the present invention, said core has a surface integral $V_{01}$ of between about $19 \cdot 10^{-3}$ µm and $25 \cdot 10^{-3}$ µm, the surface integral being defined according to the following equation:

$$V_{01} = \int_0^{r_1} \Delta n(r) \cdot dr \approx \frac{\Delta n_0 \cdot (r_1 + r_0) + \Delta n_2 \cdot (r_1 - r_0)}{2},$$

where $\Delta n_0 = n_0 - n_4$ is the refractive-index difference of said centre part of said core with respect to said outer cladding, and $\Delta n_2 = n_2 - n_4$ is the refractive-index difference of said intermediate cladding with respect to said outer cladding.

In yet another embodiment of the present invention, said trench has a surface integral $V_{03}$ of between about $-55 \cdot 10^{-3}$ µm and 0, the surface integral $V_{03}$ being defined according to the following equation $$V_{03} = \int_{r_2}^{r_3} \Delta n(r) \cdot dr \approx (r_3 - r_2) \times \Delta n_3,$$

where $\Delta n_3 = n_3 - n_4$ is the refractive-index difference of said trench with respect to said outer cladding.

In yet another embodiment of the present invention, said core has a volume integral $V_{11}$ of between about $80 \cdot 10^{-3}$ µm² and $105 \cdot 10^{-3}$ µm², the volume integral $V_{11}$ being defined according to the following equation $$V_{11} = 2 \cdot \int_0^{r_1} \Delta n(r) \cdot r \cdot dr \approx \frac{\Delta n_0 \cdot (r_1^2 + r_1 \cdot r_0 + r_0^2) + \Delta n_2 \cdot (2r_1^2 - r_1 \cdot r_0 - r_0^2)}{3},$$

where $\Delta n_0 = n_0 - n_4$ is the refractive-index difference of said centre part of said core with respect to said outer cladding, and $\Delta n_2 = n_2 - n_4$ is the refractive-index difference of said intermediate cladding with respect to said outer cladding.

In yet another embodiment of the present invention, said trench has a volume integral $V_{13}$ of between about $-1200 \cdot 10^{-3}$ µm² and 0, the volume integral $V_{13}$ being defined according to the following equation $$V_{13} = 2 \cdot \int_{r_2}^{r_3} \Delta n(r) \cdot r dr \approx (r_3^2 - r_2^2) \times \Delta n_3,$$

where $\Delta n_3 = n_3 - n_4$ is the refractive-index difference of said trench with respect to said outer cladding.

In yet another embodiment of the present invention, said at least two dopants belong to the group comprising:

Germanium oxide;

Fluorine;

Phosphorus oxide;

Boron oxide.

In yet another embodiment of the present invention, the cladding comprises a dopant inducing refractive index lower than silica and such a dopant induces a refractive index decrease of $-0.20 \times 10^{-3}$ or less.

In yet another embodiment of the present invention, the centre part of the core comprises a dopant inducing refractive index higher than silica and such a dopant induces a refractive index increase of $0.6 \times 10^{-3}$ or more.

In yet another embodiment, the optical fibre has a Mode Field Diameter comprised between 8.6 µm and 9.5 µm at a 1310 nm wavelength and a maximum Cable cut-off wavelength of 1260 nm.

Moreover, the present invention relates to a method of manufacturing a single mode optical fibre having a core and a cladding, the core refractive index profile having a trapezoid-like shape, said method comprising a first step of Chemical Vapour Deposition to form a core-rod, followed by a second step of overcladding said core-rod to obtain a preform, followed by a third step of drawing an optical fibre from said preform, wherein the first step of Chemical Vapour Deposition comprises a step of gradually changing a concentration of at least two dopants in said transition part from a concentration in said centre part of said core to a concentration in a cladding part adjacent to said core.

In an embodiment of the present invention, the first step of Chemical Vapour Deposition including the step of gradually changing said concentration is carried out by introducing said dopants into a core-rod by means of a FCVD (for Furnace Chemical Vapour Deposition) process or by means of a PCVD (for Plasma Chemical Vapour Deposition) process.

The present invention also relates to an optical fibre transmission system comprising at least one single mode fibre according to the invention.

4. BRIEF DESCRIPTION OF THE DRAWINGS

Other features and advantages of embodiments of the invention shall appear from the following description, given by way of an indicative and non-exhaustive example and from the appended drawings, of which:

The components in the figures are not necessarily to scale, emphasis instead being placed upon illustrating the principles of the invention.

5. DETAILED DESCRIPTION

Figure 1:
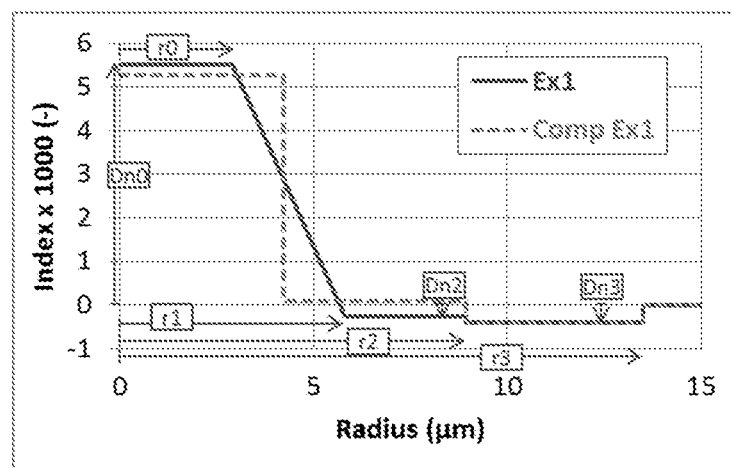
FIG. 1 depicts a refractive-index profile for an exemplary optical fibre according to the present invention. This refractive-index profile is a design profile, which is representative of the optical fibre's theoretical profile.
Figure 2:
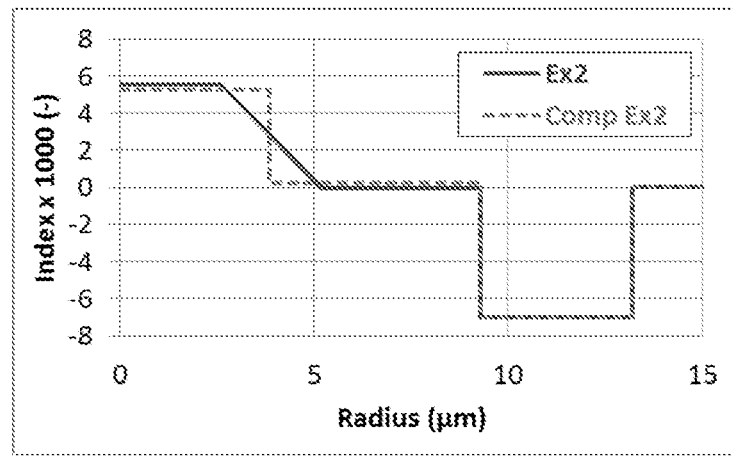
FIG. 2 depicts a refractive-index profile for another exemplary optical fibre according to the present invention. This refractive-index profile is also a design profile, which is representative of the optical fibre's theoretical profile.

FIGS. 1 and 2 show diagrams of the index profile of a fibre constituting a first (referenced as Ex1) and a second (referenced as Ex2) embodiment of the invention; in these embodiments, the index profile is a trapezoid type index profile with a ring, and it presents, starting from the centre of the fibre:

- a centre part of the core having a substantially constant refractive index greater than that of the cladding;
- a first annular portion of the core, in which the index decreases in substantially linear manner, from the index of the centre part of the core to the index of the intermediate cladding. Such an annular portion of the core is also called "transition part" of the core's trapezoid-like index profile, throughout the present document;
- an intermediate cladding;
- a trench (e.g. a depressed cladding);
- an outer cladding.

The fibre as a whole thus constitutes a fibre having a so-called "trapezoid-like" profile.

The centre part of the core has a radius $r_0$ and an index difference $\Delta n_0$ relative to the outer cladding. In the transition part of the core, the refractive index difference decreases substantially linearly. The refractive index of the core typically has a trapezoid shape. Accordingly, the refractive-index difference $\Delta n(r)$ between the central core and the outer cladding depends on the distance r from the centre of the optical fibre (e.g. decreasing as the distance from the centre of the optical fibre increases). As used herein, the term "refractive-index difference" does not exclude a refractive-index difference of zero.

The intermediate cladding has a radius $r_2$ and a refractive-index difference $\Delta n_2$ with respect to the outer cladding that is typically constant. The buried trench has a radius $r_3$ and a refractive-index difference $\Delta n_3$ with respect to the outer cladding that is typically constant. As used herein, the term "buried trench" is used to designate a radial portion of the optical fibre having a refractive index lower than the refractive index of the outer cladding. Such a trench has a refractive index lower than or equal to that of the first intermediate cladding.

The outer cladding ranges from a radius $r_3$ to the end of the glass part of the single mode fibre.

FIGS. 1 and 2 mostly differ from each other by the refractive index difference of the buried trench $\Delta n_3$, which is much more important in the exemplary embodiment Ex2 of FIG. 2.

In both FIGS. 1 and 2, refractive indexes n(r) are given at a 633 nm wavelength (i.e. the wavelength at which the profile is measured thanks to commercial apparatus) relatively to the outer cladding index $n_4$. These indexes are thus also called "index delta". More generally, throughout the present document, all refractive indices are given at a wavelength $\lambda$=633 nm.

Each exemplary embodiment in FIGS. 1 and 2 is compared with a single mode optical fibre having a step core index profile and showing equivalent optical characteristics (such as Mode Field Diameter, Cutoffs (Fibre Cutoff, FCO and Cable Cutoff, CCO) and Zero Dispersion Wavelength (ZDW)). These step index refractive index profiles are respectively referenced as Comp Ex1 in FIG. 1 and Comp Ex2 in FIG. 2, and are shown in dashed lines.

The Fibre Cut-off wavelength (FCO) corresponds to the effective cut-off wavelength $\lambda_{Ceff}$, such as defined by Subcommittee 86A of the International Electrotechnical Commission in the IEC 60793-1-44 standard. The Cable Cut-Off wavelength (CCO) corresponds to the cut-off wavelength in cable $\lambda_{cc}$ such as defined by Subcommittee 86A of the International Electrotechnical Commission in the IEC 60793-1-44 standard.

Table 1 below draws a comparison of the refractive index designs of the exemplary embodiments Ex1 and Ex2 of FIGS. 1 and 2 with their equivalent step index single mode fibres Comp Ex1 and Comp Ex2, as well as a comparison of the refractive index design of a third exemplary embodiment of the invention Ex3 with its equivalent step index single mode fibre Comp Ex3. The values in Table 1 correspond to the theoretical refractive-index profiles.

TABLE 1

| | ratio $r_0/r_1$ | $r_0$ (μm) | $r_1$ (μm) | $r_2$ (μm) | $r_3$ (μm) | $\Delta n_0 \times 1000$ (—) | $\Delta n_2 \times 1000$ (—) | $\Delta n_3 \times 1000$ (—) |
|---|---|---|---|---|---|---|---|---|
| Comp Ex1 | 1 | 4.23 | 4.23 | 8.91 | 13.49 | 5.28 | 0.08 | −0.4 |
| Ex1 | 0.5 | 2.9 | 5.8 | 8.91 | 13.49 | 5.51 | −0.27 | −0.4 |
| Comp Ex2 | 1 | 3.85 | 3.85 | 9.29 | 13.21 | 5.27 | 0.22 | −7.03 |
| Ex2 | 0.5 | 2.61 | 5.21 | 9.29 | 13.21 | 5.52 | −0.03 | −7.03 |
| Comp Ex3 | 1 | 3.91 | 3.91 | 9.23 | 14.81 | 5.23 | 0.1 | −7.15 |
| Ex3 | 0.5 | 2.65 | 5.31 | 9.23 | 14.81 | 5.44 | −0.18 | −7.15 |

The first column of Table 1 lists the exemplary and comparative optical fibres. The following columns provide, for each single mode fibre listed in the first column:

- the ratio $r_0/r_1$ of the centre part of the core radius to the transition part of the core outer radius;
- the radius $r_0$ of the centre part of the core, expressed in μm;
- the outer radius $r_1$ of the transition part of the core, expressed in μm;
- the outer radius $r_2$ of the intermediate cladding, expressed in μm;
- the outer radius $r_3$ of the trench, expressed in μm;
- the index delta $\Delta n_0$ of the centre part of the core;
- the index delta $\Delta n_2$ of the intermediate cladding;
- the index delta $\Delta n_3$ of the trench.

The refractive index differences in Table 1 (as well as in all the other tables throughout the present document) have been multiplied by 1000, as are the ordinate values in FIGS. 1 and 2 (for example, for the first exemplary embodiment of the invention Ex1, the index delta of the centre part of the core is $5.51 \times 10^{-3}$). The refractive-index values were measured at a wavelength of 633 nanometers.

Table 2 (below) shows optical transmission characteristics for optical single mode fibres having the refractive-index profiles depicted in Table 1. The first column identifies the exemplary and comparative optical fibres. The next columns provide, for each optical fibre:

- the Mode Field Diameter at 1310 nm (MFD 1310) expressed in μm;
- the Mode Field Diameter at 1550 nm (MFD 1550) expressed in μm;

the Fibre cut-off wavelength (FCO) expressed in nm;
the Cable Cut-off wavelength (CCO) expressed in nm;
the Zero chromatic Dispersion Wavelength (ZDW) expressed in nm;
the Zero Dispersion Slope (ZDS) expressed in ps/nm$^2$-km.

TABLE 2

|  | MFD 1310 (μm) | MFD 1550 (μm) | FCO (nm) | CCO (nm) | ZDW (nm) | ZDS (ps/nm$^2$-km) |
|---|---|---|---|---|---|---|
| Comp Ex1 | 9.03 | 10.19 | 1260 | 1199 | 1316 | 0.086 |
| Ex1 | 9.03 | 10.17 | 1261 | 1203 | 1316 | 0.087 |
| Comp Ex2 | 8.77 | 9.85 | 1232 | 1182 | 1320 | 0.089 |
| Ex2 | 8.76 | 9.82 | 1235 | 1182 | 1320 | 0.090 |
| Comp Ex3 | 8.76 | 9.80 | 1369 | 1232 | 1317 | 0.089 |
| Ex3 | 8.77 | 9.80 | 1375 | 1232 | 1317 | 0.090 |

Table 3 (below) shows bending losses for optical fibres having the refractive-index profiles depicted in Table 1 for the wavelengths of 1550 nanometers and 1625 nanometers for radii of curvature of 15 millimeters, 10 millimeters, 7.5 millimeters and 5 millimeters, such as:
R15 mm Macro bend loss at 1550 nm (R15BL at 1550), expressed in dB/10 T, where 10 T stands for 10 turns;
R10 mm Macro bend loss at 1550 nm (R10BL at 1550), expressed in dB/1 T, where 1 T stands for 1 turn;
R7.5 mm Macro bend loss at 1550 nm (R7.5BL at 1550), expressed in dB/1 T, where 1 T stands for 1 turn;
R5 mm Macro bend loss at 1550 nm (R5BL at 1550), expressed in dB/1 T, where 1 T stands for 1 turn;
R15 mm Macro bend loss at 1625 nm (R15BL at 1625), expressed in dB/10 T, where 10 T stands for 10 turns;
R10 mm Macro bend loss at 1625 nm (R10BL at 1625), expressed in dB/1 T, where 1 T stands for 1 turn;
R7.5 mm Macro bend loss at 1625 nm (R7.5BL at 1625), expressed in dB/1 T, where 1 T stands for 1 turn;
R5 mm Macro bend loss at 1625 nm (R5BL at 1625), expressed in dB/1 T, where 1 T stands for 1 turn.

TABLE 3

|  | R15BL at 1550 (dB/10T) | R10BL at 1550 (dB/1T) | R7.5BL at 1550 (dB/1T) | R5BL at 1550 (dB/1T) | R15BL at 1625 (dB/10T) | R10BL at 1625 (dB/1T) | R7.5BL at 1625 (dB/1T) | R5BL at 1625 (dB/1T) |
|---|---|---|---|---|---|---|---|---|
| Comp Ex1 | 0.034 | 0.230 | 1.7 | 11 | 0.2 | 0.72 | 3.7 | 17 |
| Ex1 | 0.022 | 0.17 | 1.3 | 9 | 0.14 | 0.54 | 3.0 | 15 |
| Comp Ex2 | 0.021 | 0.045 | 0.16 | 0.49 | 0.11 | 0.13 | 0.35 | 0.88 |
| Ex2 | 0.015 | 0.036 | 0.14 | 0.43 | 0.080 | 0.11 | 0.30 | 0.77 |
| Comp Ex3 | 0.0054 | 0.0097 | 0.031 | 0.089 | 0.030 | 0.029 | 0.071 | 0.17 |
| Ex3 | 0.0046 | 0.0086 | 0.028 | 0.080 | 0.026 | 0.026 | 0.064 | 0.16 |

In accordance with Tables 2 and 3 (above), the optical fibres according to embodiments of the invention show bending losses, which are less than the comparative optical fibres, which have a step-index profile. Moreover, the present optical fibres typically have substantially the same (i) cable cut-off wavelength, (ii) zero-chromatic dispersion wavelength (ZDW), (iii) zero-dispersion slope (ZDS), and (iv) mode field diameter (MFD) as the comparative optical fibres.

The three refractive index profile examples Ex1, Ex2, and Ex3 according to embodiments of the invention, described in Tables 1 to 3, as well as in FIGS. 1 and 2 for Ex1 and Ex2, comply with the ITU-T G. 652 Recommendation.

As a reminder, Recommendation ITU-T G.652 describes the geometrical, mechanical and transmission attributes of a single-mode optical fibre and cable, which has zero-dispersion wavelength around 1310 nm. The ITU-T G.652 fibre was originally optimized for use in the 1310 nm wavelength region, but can also be used in the 1550 nm region. Table 4 below summarizes the fibre attributes for the best category of G. 652 fibres, referenced as G.652.D (source ITU-T G. 652 Recommendation, November 2009). The refractive profile design plays a role on the following parameters in this table: Mode Field Diameter at 1310 nm (MFD1310), Cable Cutoff (CCO), R30 mm Macro bend loss at 1625 nm (R30BL1625), Zero Dispersion Wavelength ($\lambda_0$ or ZDW) and Zero Dispersion Slope ($S_0$ or ZDS).

TABLE 4

| Fibre attributes | | |
|---|---|---|
| Attribute | Detail | Value |
| Mode field diameter | Wavelength | 1310 mm |
|  | Range of nominal values | 8.6-9.5 μm |
|  | Tolerance | ±0.6 μm |
| Cladding diameter | Nominal | 125.0 μm |
|  | Tolerance | ±1 μm |
| Core Concentricity error | Maximum | 0.6 μm |
| Cladding noncircularity | Maximum | 1.0% |
| Cable cut-off wavelength | Maximum | 1260 nm |
| Macrobend loss | Radius | 30 mm |
|  | Number of turns | 100 |
|  | Maximum at 1625 nm | 0.1 dB |
| Proof stress | Minimum | 0.69 GPa |
| Chromatic dispersion coefficient | $\lambda_{0min}$ | 1300 nm |
|  | $\lambda_{0max}$ | 1324 nm |
|  | $S_{0max}$ | 0.092 ps/nm$^2$ × km |

The second and third exemplary embodiments of the invention Ex2 and Ex3 also comply with the ITU-T Rec G. 657.A2 Bend Insensitive Fibre Category. The third exemplary embodiment of the invention Ex3 also comply with the ITU-T Rec G. 657.63 Bend Insensitive Fibre Category.

As already stated above in the summary of the invention, the refractive index profiles detailed in FIGS. 1 and 2 as well as in Tables 1 to 3 are achieved through a careful and gradual change in the concentration of multiple dopants in the transition part of the trapezoidal core.

Many dopants may be used in the context of the present invention, such as, for example, Germanium and Phosphorus, which both allow increasing the refractive index, and Boron and Fluorine, which both allow decreasing the refractive index.

The one skilled in the art will easily understand that these dopants, except for Fluorine, are present in the silica ($SiO_2$) matrix in the form of oxides. Hence, throughout the present document, the use of Germanium as dopant means, for example, the use of Germanium dioxide ($GeO_2$).

The following examples focus on the use of Germanium and Fluorine as dopants in a single mode fibre according to embodiments of the invention.

Table 5 (below) shows the Rayleigh scattering losses at 1550 nanometers for twelve exemplary trapezoidal core fibre profiles in accordance with the present invention. These twelve exemplary core fibre profiles correspond to the three exemplary embodiments Ex1 to Ex3 described above, when considering different dopant cases, i.e. different co-doping scenarios.

The values given in Table 5 correspond to Rayleigh scattering losses computed thanks to Equation (1) in document "*Rayleigh Scattering Reduction Method for Silica-Based Optical Fiber*", Journal of Lightwave Technology, Vol. 18, No. 11, November 2000 by Kyozo Tsujikawa et al. In this document, the Rayleigh scattering coefficient of $GeO_2$ and fluorine co-doped silica glass $A_{GeO2-F}$ is reported to be:

$$A_{GeO2-F} = A_{SiO2}(1 + 0.62[GeO_2] + 0.60[F]^2 + 0.44[GeO_2][F]^2)$$

where $A_{SiO2}$ is the Rayleigh scattering coefficient of pure silica glass, and where $[GeO_2]$ and $[F]$ correspond to the relative-refractive index differences between the samples and pure silica glass induced by $GeO_2$ and fluorine respectively, as a measure of dopant concentration.

In Table 5, the value of the Rayleigh scattering coefficient of pure silica glass $A_{SiO2}$ is 0.81 dB/km-$\mu m^4$, and we consider an index increase at draw of $+0.4 \times 10^{-3}$. The first column identifies the exemplary and comparative optical fibres. The third to fourteenth columns correspond to each of the twelve co-doping scenarios, which have been investigated, referenced as Case1 to Case12. The top part of Table 5, namely the second to eighth lines, highlights the presence of dopants in the different parts of the optical fibre. Hence:

second line indicates the concentration in Fluorine in the centre part of the core, expressed as an index delta;

third line indicates the concentration in Germanium in the centre part of the core, expressed as an index delta;

fourth line indicates the concentration in Germanium in the intermediate cladding, expressed as an index delta;

fifth line indicates the concentration in Fluorine in the intermediate cladding expressed as an index delta;

sixth line indicates the concentration in Germanium in the trench expressed as an index delta;

seventh line indicates the concentration in Fluorine in the outer cladding;

eighth line indicates whether the change of refractive index in the transition part of the core is achieved through a double Germanium and Fluorine ramping (Ge+F), through a single Fluorine ramping (F only) or through a single Germanium ramping (Ge only).

TABLE 5

Rayleigh @1550 nm (dB/km)

| | | | Case1 | Case2 | Case3 | Case4 | Case5 | Case6 | Case7 |
|---|---|---|---|---|---|---|---|---|---|
| | | F-Top Core | 0 | −2 | 0 | 0 | 0 | $\Delta n_2 - 0.4$ | 0 |
| | | Ge-Top Core | $\Delta n_0 - 0.4$ | $\Delta n_0 + 2 - 0.4$ | $\Delta n_0 - 0.4$ | $\Delta n_0 - 0.4$ | $\Delta n_0 - 0.4$ | $\Delta n_0 - \Delta n_2$ | $\Delta n_0 - 3.9$ |
| | | Ge-Int Clad | 0 | 0 | 2 | 0 | 0 | 0 | 0 |
| | | F- Int Clad | $\Delta n_2 - 0.4$ | $\Delta n_2 - 0.4$ | $\Delta n_2 - 2 - 0.4$ | $\Delta n_2 - 0.4$ | $\Delta n_2 - 0.4$ | $\Delta n_2 - 0.4$ | $\Delta n_2 - 3.9$ |
| | | Ge- Trench | 0 | 0 | 0 | 2 | 0 | 0 | 0 |
| | | F-Ext Clad | 0 | 0 | 0 | 0 | 0 | 0 | −3.5 |
| | | Transition Ramping | Ge + F | Ge + F | Ge + F | Ge + F | F only | Ge Only | Ge + F |
| Comp Ex1 | (1) | | 0.16251 | 0.17321 | 0.16578 | 0.16266 | 0.16251 | 0.16251 | 0.14801 |
| Ex1 | (2) | | 0.16331 | 0.17383 | 0.16666 | 0.16345 | 0.16985 | 0.16652 | 0.14880 |
| | (2 − 1) × 1000 | | 0.80 | 0.62 | 0.88 | 0.79 | 7.34 | 4.01 | 0.79 |
| Comp Ex2 | (3) | | 0.16130 | 0.17142 | 0.16520 | 0.16138 | 0.16130 | 0.16130 | 0.14783 |
| Ex2 | (4) | | 0.16201 | 0.17185 | 0.16603 | 0.16207 | 0.16914 | 0.16387 | 0.14862 |
| | (4 − 3) × 1000 | | 0.71 | 0.43 | 0.83 | 0.69 | 7.84 | 2.57 | 0.79 |
| Comp Ex3 | (5) | | 0.16150 | 0.17179 | 0.16528 | 0.16157 | 0.16150 | 0.16150 | 0.14779 |
| Ex3 | (6) | | 0.16207 | 0.17211 | 0.16597 | 0.16214 | 0.16904 | 0.16469 | 0.14843 |
| | (6 − 5) × 1000 | | 0.57 | 0.32 | 0.69 | 0.57 | 7.54 | 3.19 | 0.64 |

| | | | Case8 | Case9 | Case10 | Case11 | Case12 |
|---|---|---|---|---|---|---|---|
| | | F-Top Core | 0 | 0 | 0 | 0 | 0 |
| | | Ge-Top Core | $\Delta n_0 - 4.9$ | $\Delta n_0 - 5.4$ | $\Delta n_0 - 3.9$ | $\Delta n_0 - 4.9$ | $\Delta n_0 - 5.4$ |
| | | Ge-Int Clad | 0 | 0 | 0 | 0 | 0 |
| | | F- Int Clad | $\Delta n_2 - 4.9$ | $\Delta n_2 - 5.4$ | $\Delta n_2 - 3.9$ | $\Delta n_2 - 4.9$ | $\Delta n_2 - 5.4$ |
| | | Ge- Trench | 0 | 0 | 0 | 0 | 0 |
| | | F-Ext Clad | −4.5 | −5 | −3.5 | −4.5 | −5 |
| | | Transition Ramping | Ge + F | Ge + F | F only | F only | F only |
| Comp Ex1 | (1) | | 0.14430 | 0.14251 | 0.14801 | 0.14430 | 0.14251 |
| Ex1 | (2) | | 0.14496 | 0.14309 | 0.15105 | 0.14583 | 0.14325 |
| | (2 − 1) × 1000 | | 0.66 | 0.58 | 3.04 | 1.53 | 0.74 |
| Comp Ex2 | (3) | | 0.14449 | 0.14290 | 0.14783 | 0.14449 | 0.14290 |

TABLE 5-continued

| | | Rayleigh @1550 nm (dB/km) | | | | |
|---|---|---|---|---|---|---|
| Ex2 | (4) | 0.14518 | 0.14352 | 0.15110 | 0.14615 | 0.14371 |
| | (4 − 3) × 1000 | 0.69 | 0.62 | 3.27 | 1.66 | 0.81 |
| Comp Ex3 | (5) | 0.14435 | 0.14271 | 0.14779 | 0.14435 | 0.14271 |
| Ex3 | (6) | 0.14489 | 0.14318 | 0.15077 | 0.14573 | 0.14324 |
| | (6 − 5) × 1000 | 0.54 | 0.47 | 2.98 | 1.38 | 0.53 |

Figure 3:
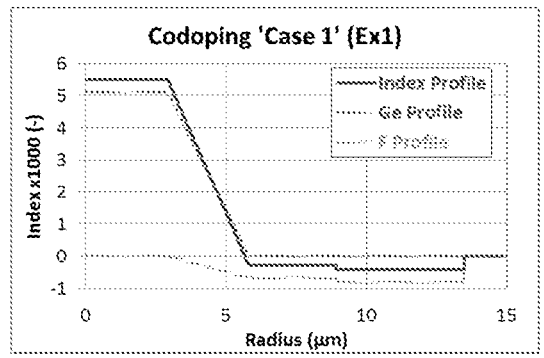
FIG. 3 shows a first case of co-doping scenario allowing to achieve the refractive-index profile of FIG. 1.

Case 1 corresponds to a single mode fibre with no fluorine in the centre part of the core, no Germanium, neither in the intermediate cladding nor in the trench, and no fluorine in the outer cladding. The centre part of the core contains Germanium with a concentration of $\Delta n_0$-0.4 and the intermediate cladding contains Fluorine with a concentration $\Delta n_2$-0.4. A double Germanium and Fluorine co-doping linearly changing from the centre part of the core to the intermediate cladding induces the change of refractive index in the transition part of the core. FIG. 3 illustrates the co-doping profile of Case 1 for the first exemplary embodiment of the invention Ex1, and shows the overall refractive index profile of the fibre, as well as the Germanium composition (Ge Profile) and the Fluorine Composition (F profile) given in refractive index unit. In other words, when a Germanium concentration of $+1\times10^{-3}$ is indicated, this means the Germanium concentration induces a refractive index increase of $+1\times10^{-3}$. The link between a dopant concentration in part of the fibre and the change of refractive index it induces can be understood by reading "*Refractive Index of Doped and Undoped PCVD Bulk Silica*", *Mat. Res. Bull.*, Vol. 24, pp. 1083-1097, 1989, by W. Hermann and D. U. Wiechert.

Figure 4:
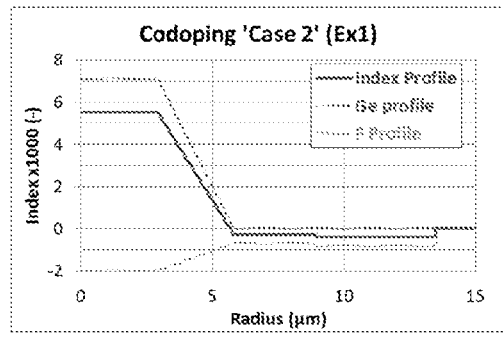
FIG. 4 shows a second case of co-doping scenario allowing to achieve the refractive-index profile of FIG. 1.

Case 2 corresponds to a single mode fibre with a fluorine concentration in the centre part of the core inducing a refractive index decrease of $-2\times10^{-3}$, no Germanium, neither in the intermediate cladding nor in the trench, and no fluorine in the outer cladding. The centre part of the core contains Germanium with a concentration of $\Delta n_0+2$-0.4 and the intermediate cladding contains Fluorine with a concentration $\Delta n_2$-0.4. A double Germanium and Fluorine co-doping linearly changing from the centre part of the core to the intermediate cladding induces the change of refractive index in the transition part of the core. FIG. 4 illustrates the co-doping profile of Case 2 for the first exemplary embodiment of the invention Ex1, and shows the overall refractive index profile of the fibre, as well as the Germanium composition (Ge Profile) and the Fluorine Composition (F profile) given in refractive index unit.

Figure 5:
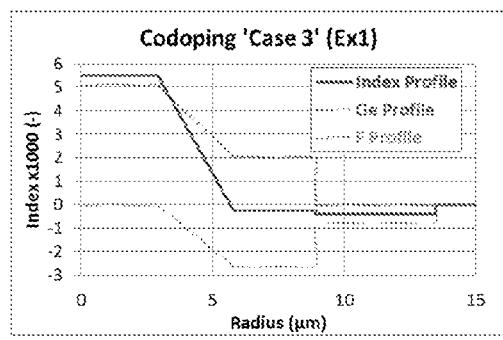
FIG. 5 shows a third case of co-doping scenario allowing to achieve the refractive-index profile of FIG. 1.

Case 3 corresponds to a single mode fibre with no fluorine in the centre part of the core, a Germanium concentration in the intermediate cladding inducing a refractive index increase of $+2\times10^{-3}$, no Germanium in the trench, and no fluorine in the outer cladding. The centre part of the core contains Germanium with a concentration of $\Delta n_0$-0.4 and the intermediate cladding contains Fluorine with a concentration $\Delta n_2$-2-0.4. A double Germanium and Fluorine co-doping linearly changing from the centre part of the core to the intermediate cladding induces the change of refractive index in the transition part of the core. FIG. 5 illustrates the co-doping profile of Case 3 for the first exemplary embodiment of the invention Ex1, and shows the overall refractive index profile of the fibre, as well as the Germanium composition (Ge Profile) and the Fluorine Composition (F profile) given in refractive index unit.

Figure 6:
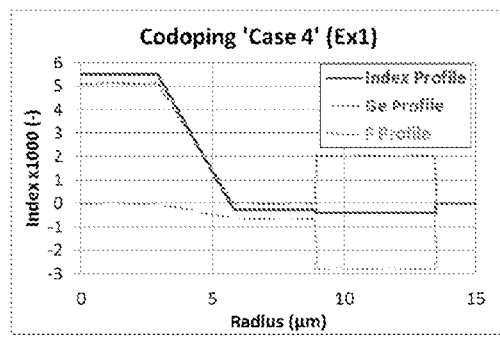
FIG. 6 shows a fourth case of co-doping scenario allowing to achieve the refractive-index profile of FIG. 1.

Case 4 corresponds to a single mode fibre with no fluorine in the centre part of the core, no Germanium in the intermediate cladding, a Germanium concentration in the trench inducing a refractive index increase of $+2\times10^{-3}$, and no fluorine in the outer cladding. The centre part of the core contains Germanium with a concentration of $\Delta n_0$-0.4 and the intermediate cladding contains Fluorine with a concentration $\Delta n_2$-0.4. A double Germanium and Fluorine co-doping linearly changing from the centre part of the core to the intermediate cladding induces the change of refractive index in the transition part of the core. FIG. 6 illustrates the co-doping profile of Case 3 for the first exemplary embodiment of the invention Ex1, and shows the overall refractive index profile of the fibre, as well as the Germanium composition (Ge Profile) and the Fluorine Composition (F profile) given in refractive index unit.

Figure 7:
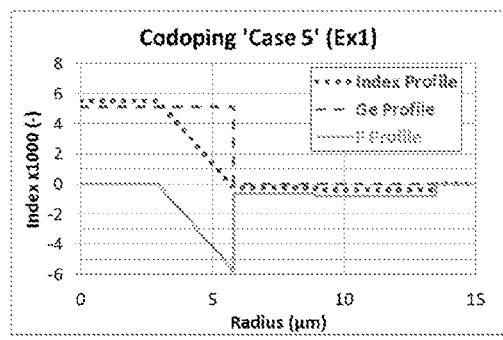
FIG. 7 shows a fifth case of co-doping scenario allowing to achieve the refractive-index profile of FIG. 1.

Case 5 corresponds to a single mode fibre with no fluorine in the centre part of the core, no Germanium, neither in the intermediate cladding nor in the trench, and no fluorine in the outer cladding. The Germanium concentration in the transition part of the core is fixed at the same level as in the centre part of the core. The centre part of the core contains Germanium with a concentration of $\Delta n_0$-0.4 and the intermediate cladding contains Fluorine with a concentration $\Delta n_2$-0.4. A single Fluorine doping linearly changing from the centre part of the core to the intermediate cladding induces the change of refractive index in the transition part of the core. FIG. 7 illustrates the co-doping profile of Case 1 for the first exemplary embodiment of the invention Ex1, and shows the overall refractive index profile of the fibre, as well as the Germanium composition (Ge Profile) and the Fluorine Composition (F profile) given in refractive index unit.

Figure 8:
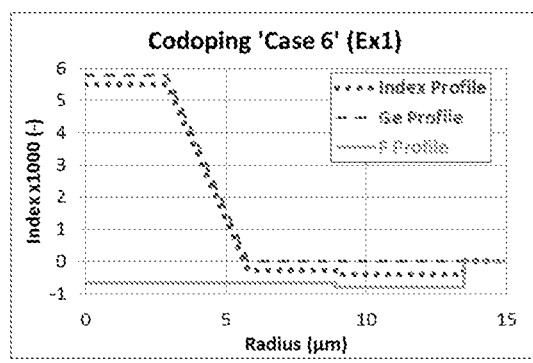
FIG. 8 shows a sixth case of co-doping scenario allowing to achieve the refractive-index profile of FIG. 1.

Case 6 corresponds to a single mode fibre with no Germanium, neither in the intermediate cladding nor in the trench, and no fluorine in the outer cladding. The Fluorine concentration in the core is fixed at the same level as in the intermediate cladding, i.e. $\Delta n_2$-0.4. The centre part of the core contains Germanium with a concentration of $\Delta n_0$-$\Delta n_2$. A single Germanium doping linearly changing from the centre part of the core to the intermediate cladding induces the change of refractive index in the transition part of the core. FIG. 8 illustrates the co-doping profile of Case 1 for the first exemplary embodiment of the invention Ex1, and shows the overall refractive index profile of the fibre, as well as the Germanium composition (Ge Profile) and the Fluorine Composition (F profile) given in refractive index unit.

Cases 7 to 12 correspond to single mode fibres with no fluorine in the centre part of the core, and no Germanium, neither in the intermediate cladding nor in the trench. In these cases however, the outer cladding is doped with Fluorine, thus allowing changing dopant compositions, as the outer cladding is the reference for the index delta. This especially allows significantly reducing the Germanium index delta in the centre part of the core, which is well known to be helpful to reduce Rayleigh scattering. Pure silica layers may be used at the very end of the outer cladding (i.e. for radius of 30 μm or higher). Lines 3 and 5 in Table 5 indicate the concentration in Germanium in the centre part of the core (expressed as a function of the refractive index delta of the centre part of the core $\Delta n_0$) and the concentration in Fluorine in the intermediate cladding (expressed as a function of the refractive index delta of the intermediate cladding $\Delta n_2$) for each of these cases 7 to 12.

Table 6 (below) provides the same estimation of the Rayleigh scattering losses, for the same twelve exemplary embodiments, without considering index increase at draw.

ate cladding is set at $\Delta n_2$ ($Max(\Delta n_2;0)=\Delta n_2$) and the concentration of Fluorine in the intermediate cladding is set at 0 ($Min(\Delta n_2;0)=0$). In the opposite case, when the refractive index delta of the intermediate cladding $\Delta n_2$ is negative, the concentration of Germanium in the intermediate cladding is set at 0 ($Max(\Delta n_2;0)=0$) and the concentration of Fluorine in the intermediate cladding is set at $\Delta n_2$ ($Min(\Delta n_2;0)=\Delta n_2$).

By way of numerical example, as can be observed on FIG. 4, the index delta of the core's centre part is $5.51\times10^{-3}$, including a Fluorine content of $-2.00\times10^{-3}$. In Table 5, this

TABLE 6

| | | Rayleigh @1550 nm (dB/km) | | | | | | |
|---|---|---|---|---|---|---|---|---|
| | | Case1 | Case2 | Case3 | Case4 | Case5 | Case6 | Case7 |
| | F-Top Core | 0 | −2 | 0 | 0 | 0 | $Min(\Delta n_2; 0)$ | 0 |
| | Ge-Top Core | $\Delta n_0$ | $\Delta n_0 + 2$ | $\Delta n_0$ | $\Delta n_0$ | $\Delta n_0$ | $\Delta n_0$ | $\Delta n_0 - 3.5$ |
| | Ge-Int Clad | $Max(\Delta n_2; 0)$ | | 2 | | $Max(\Delta n_2; 0)$ | | 0 |
| | F- Int Clad | $Min(\Delta n_2; 0)$ | | $\Delta n_2 - 2$ | | $Min(\Delta n_2; 0)$ | | $\Delta n_2 - 3.5$ |
| | Ge- Trench | 0 | 0 | | 2 | 0 | 0 | 0 |
| | F-Ext Clad | 0 | 0 | 0 | 0 | 0 | 0 | −3.5 |
| | Transition Ramping | Ge + F | Ge + F | Ge + F | Ge + F | F only | Ge Only | Ge + F |
| Comp Ex1 | (1) | 0.16443 | 0.17515 | 0.16742 | 0.16457 | 0.16443 | 0.16443 | 0.14955 |
| Ex1 | (2) | 0.16508 | 0.17557 | 0.16831 | 0.16521 | 0.17205 | 0.16634 | 0.15037 |
| | (2 − 1) × 1000 | 0.65 | 0.42 | 0.89 | 0.64 | 7.62 | 1.91 | 0.82 |
| Comp Ex2 | (3) | 0.16337 | 0.17352 | 0.16672 | 0.16345 | 0.16337 | 0.16337 | 0.14923 |
| Ex2 | (4) | 0.16367 | 0.17348 | 0.16754 | 0.16374 | 0.17127 | 0.16378 | 0.15005 |
| | (4 − 3) × 1000 | 0.30 | −0.04 | 0.82 | 0.29 | 7.90 | 0.41 | 0.82 |
| Comp Ex3 | (5) | 0.16339 | 0.17371 | 0.16683 | 0.16346 | 0.16339 | 0.16339 | 0.14922 |
| Ex3 | (6) | 0.16376 | 0.17376 | 0.16751 | 0.16382 | 0.17119 | 0.16454 | 0.14989 |
| | (6 − 5) × 1000 | 0.37 | 0.05 | 0.68 | 0.36 | 7.80 | 1.15 | 0.67 |
| | | Case8 | Case9 | Case10 | Case11 | Case12 | | |
| | F-Top Core | 0 | 0 | 0 | 0 | 0 | | |
| | Ge-Top Core | $\Delta n_0 - 4.5$ | $\Delta n_0 - 5.0$ | $\Delta n_0 - 3.5$ | $\Delta n_0 - 4.5$ | $\Delta n_0 - 5.0$ | | |
| | Ge-Int Clad | 0 | 0 | 0 | 0 | 0 | | |
| | F- Int Clad | $\Delta n_2 - 4.5$ | $\Delta n_2 - 5.0$ | $\Delta n_2 - 3.5$ | $\Delta n_2 - 4.5$ | $\Delta n_2 - 5.0$ | | |
| | Ge- Trench | 0 | 0 | 0 | 0 | 0 | | |
| | F-Ext Clad | −4.5 | −5 | −3.5 | −4.5 | −5 | | |
| | Transition Ramping | Ge + F | Ge + F | F only | F only | F only | | |
| Comp Ex1 | (1) | 0.14576 | 0.14394 | 0.14955 | 0.14576 | 0.14394 | | |
| Ex1 | (2) | 0.14648 | 0.14459 | 0.15316 | 0.14791 | 0.14531 | | |
| | (2 − 1) × 1000 | 0.72 | 0.65 | 3.61 | 2.15 | 1.37 | | |
| Comp Ex2 | (3) | 0.14580 | 0.14417 | 0.14923 | 0.14580 | 0.14417 | | |
| Ex2 | (4) | 0.14654 | 0.14485 | 0.15311 | 0.14812 | 0.14566 | | |
| | (4 − 3) × 1000 | 0.74 | 0.68 | 3.88 | 2.32 | 1.49 | | |
| Comp Ex3 | (5) | 0.14570 | 0.14402 | 0.14922 | 0.14570 | 0.14402 | | |
| Ex3 | (6) | 0.14629 | 0.14455 | 0.15281 | 0.14774 | 0.14523 | | |
| | (6 − 5) × 1000 | 0.59 | 0.53 | 3.59 | 2.04 | 1.21 | | |

In cases 1, 2, 4, 5 and 6, in the comparative examples and without index increase at draw (Table 6), the intermediate cladding delta is slightly positive. As a consequence, very small concentrations of germanium are introduced in the intermediate cladding (0.08, 0.22 and 0.10 for the respective comparative examples Comp Ex1, Comp Ex2 and Comp Ex3). In these comparative examples, the intermediate claddings do not include any Fluorine.

Actually, as indicated in Table 6, line 4, the concentration of Germanium in the intermediate cladding is set at Max ($\Delta n_2;0$) for cases 1, 2, 4, 5 and 6, while line 5 indicates that the concentration of Fluorine in the intermediate cladding is set at Min($\Delta n_2;0$) for these cases. As a consequence, when the refractive index delta of the intermediate cladding $\Delta n_2$ is positive, the concentration of Germanium in the intermediis done thanks to $+7.11\times10^{-3}$ of Germanium, $-2.00\times10^{-3}$ of Fluorine and accounting an index increase at draw of $0.4\times10^{-3}$ (actually, $5.51\times10^{-3}=+7.11\times10^{-3}-2.00\times10^{-3}+0.4\times10^{-3}$).

In Table 6, this is done thanks to $+7.51\times10^{-3}$ of Germanium, $-2.00\times10^{-3}$ of Fluorine and accounting no index increase at draw (actually, $5.51\times10^{-3}=+7.51\times10^{-3}-2.00\times10^{-3}$).

As can be observed from Tables 5 and 6, in all double Germanium and Fluorine ramping cases, the Rayleigh scattering losses at 1550 nm increase of less than 0.001 dB/km for the exemplary trapezoidal core single mode fibres according to the invention compared to the equivalent step index cases.

Except on Case 6 of the second exemplary embodiment Ex2 in Table 6 and on Case 12 in Table 5, this increase is higher than 0.001 dB/km in the simple ramping cases.

Actually, as may be observed in Table 5, the single ramping examples of cases 5 and 6 are not acceptable, as they lead to a severe increase in Rayleigh scattering, for the exemplary embodiments Ex1, Ex2 and Ex3 as compared to the comparative examples Comp Ex1, Comp Ex2, and Comp Ex3. As regards Case 12, it may be observed that single ramping is only acceptable for a low concentration in Germanium in the centre part of the core, namely below $0.6 \times 10^{-3}$.

As regards Table 6, the single ramping examples of case 5 (for all exemplary embodiments Ex1 to Ex3) and of case 6 for the first exemplary embodiment Ex1 are not acceptable as they also lead to a severe increase in Rayleigh scattering. As regards the single ramping example of Case 6, it only gives acceptable results in terms of Rayleigh scattering for the second and third exemplary embodiments Ex2 and Ex3 for a low concentration of Fluorine in the intermediate cladding, namely below $-0.20 \times 10^{-3}$. The single ramping example of Case 12 is only acceptable for a low concentration in Germanium in the centre part of the core, namely below $0.6 \times 10^{-3}$.

Profiles obtained with double ramping cases are hence preferred as they are guaranteeing Rayleigh increase of less than 0.002, or 0.001 dB/km, compared to the equivalent step index cases.

The transition part of the core (ranging from radius $r_0$ to radius $r_1$) should thus be produced by applying a soft transition of the two (or more) present dopants.

Moreover, the Fluorine content in the cladding should be preferably $-0.20 \times 10^{-3}$ or less, as the Rayleigh gain for a double Fluorine-Germanium ramping compared to a single ramping is $-1$ mdB/km or lower. More generally, the invention helps when a dopant inducing refractive index lower than Silica is present in the cladding and induces a refractive index decrease of $-0.20 \times 10^{-3}$ or less.

The Germanium content in the centre part of the core should also be preferably $+0.60 \times 10^{-3}$ or more, as the Rayleigh gain for a double Fluorine-Germanium ramping compared to a single ramping is $-1$ mdB/km or lower. More generally, the invention helps when a dopant inducing refractive index higher than Silica is present in the core's centre part and induces a refractive index increase of $+0.60 \times 10^{-3}$ or more.

We now present interesting tools and methods for defining acceptable profile ranges for single mode optical fibres according to the invention.

Each section of the optical fibre profile may be defined using surface integrals and volume integrals. The term "surface" should not be understood geometrically but rather should be understood as a value having two dimensions. Similarly, the term "volume" should not be understood geometrically but rather should be understood as a value having three dimensions.

Accordingly, the centre part of the central core may define a surface integral $V_{01}$ and the trench may define a surface integral $V_{03}$ respectively defined by the following equations:

$$V_{01} = \int_0^{r_1} \Delta n(r) \cdot dr \approx \frac{\Delta n_0 \cdot (r_1 + r_0) + \Delta n_2 \cdot (r_1 - r_0)}{2}$$

$$V_{03} = \int_{r_2}^{r_3} \Delta n(r) \cdot dr \approx (r_3 - r_2) \times \Delta n_3$$

Moreover, the centre part of the central core may define a volume integral $V_{11}$, and the trench may define a volume integral $V_{13}$ defined by the following equations, respectively:

$$V_{11} = 2 \cdot \int_0^{r_1} \Delta n(r) \cdot r \cdot dr \approx \frac{\Delta n_0 \cdot (r_1^2 + r_1 \cdot r_0 + r_0^2) + \Delta n_2 \cdot (2r_1^2 - r_1 \cdot r_0 - r_0^2)}{3}$$

$$V_{13} = 2 \cdot \int_{r_2}^{r_2} \Delta n(r) \cdot r dr \approx (r_3^2 - r_2^2) \times \Delta n_3$$

Table 7 (below) completes Table 1 (above) with the values of the surface and volume integrals $V_{01}$, $V_{03}$, $V_{11}$ and $V_{13}$ described above for the first, second and third exemplary embodiments of the invention Ex1, Ex2 and Ex3, as well as for their comparative step index single mode fibres Comp Ex1, Comp Ex2 and Comp Ex3. All the examples in Table 7 are hence the same as in Table 1. The values in Table 7 correspond to the theoretical refractive-index profiles.

The first column in Table 7 lists the exemplary and comparative optical fibres. The second column provides the value of the ratio $r_0/r_1$ of the centre part of the core radius $r_0$ to the transition part of the core outer radius $r_1$. The next four columns provide the radii of the centre part of the core, the transition part of the core, the intermediate cladding, and the buried trench. The next three columns provide the corresponding index differences relatives to the outer cladding. Finally, the last four columns provide respective values for the surface and volume integrals $V_{01}$, $V_{03}$, $V_{11}$ and $V_{13}$. As before, the refractive-index differences and the integrals in Table 7 have been multiplied by 1000. The refractive-index values were measured at a wavelength of 633 nanometers.

TABLE 7

|  | ratio $r_0/r_1$ | $r_0$ (μm) | $r_1$ (μm) | $r_2$ (μm) | $r_3$ (μm) | Dn0 × 1000 (—) | Dn2 × 1000 (—) | Dn3 × 1000 (—) | V01 × 1000 (μm) | V03 × 1000 (μm) | V11 × 1000 (μm$^2$) | V13 × 1000 (μm$^2$) |
|---|---|---|---|---|---|---|---|---|---|---|---|---|
| Comp Ex1 | 1 | 4.23 | 4.23 | 8.91 | 13.49 | 5.28 | 0.08 | −0.4 | 22.3 | −1.8 | 94 | −41 |
| Ex1 | 0.5 | 2.9 | 5.8 | 8.91 | 13.49 | 5.51 | −0.27 | −0.4 | 23.6 | −1.8 | 104 | −41 |
| Comp Ex2 | 1 | 3.85 | 3.85 | 9.29 | 13.21 | 5.27 | 0.22 | −7.03 | 20.3 | −27.6 | 78 | −620 |
| Ex2 | 0.5 | 2.61 | 5.21 | 9.29 | 13.21 | 5.52 | −0.03 | −7.03 | 21.5 | −27.6 | 87 | −620 |

TABLE 7-continued

| | ratio r0/r1 | r0 (μm) | r1 (μm) | r2 (μm) | r3 (μm) | Dn0 × 1000 (—) | Dn2 × 1000 (—) | Dn3 × 1000 (—) | V01 × 1000 (μm) | V03 × 1000 (μm) | V11 × 1000 (μm²) | V13 × 1000 (μm²) |
|---|---|---|---|---|---|---|---|---|---|---|---|---|
| Comp Ex3 | 1 | 3.91 | 3.91 | 9.23 | 14.81 | 5.23 | 0.1 | −7.15 | 20.4 | −39.9 | 80 | −959 |
| Ex3 | 0.5 | 2.65 | 5.31 | 9.23 | 14.81 | 5.44 | −0.18 | −7.15 | 21.4 | −39.9 | 87 | −959 |

Table 8 (below) depicts nine exemplary trapezoid-shape core fibre profiles in accordance with the present invention. Note that Examples 1-3 in Table 8 are the same as in Table 7. The values in Table 8 correspond to the theoretical refractive-index profiles. The structure of Table 8 is the same as that of Table 7 and hence, is not recalled, for sake of simplicity.

The new examples given in Table 8 are obtained when playing with the ratio $r_0/r_1$.

TABLE 8

| | ratio r0/r1 | r0 (μm) | r1 (μm) | r2 (μm) | r3 (μm) | Dn0 × 1000 (—) | Dn2 × 1000 (—) | Dn3 × 1000 (—) | V01 × 1000 (μm) | V03 × 1000 (μm) | V11 × 1000 (μm²) | V13 × 1000 (μm²) |
|---|---|---|---|---|---|---|---|---|---|---|---|---|
| Ex1 | 0.50 | 2.9 | 5.8 | 8.91 | 13.49 | 5.51 | −0.27 | −0.4 | 23.6 | −1.8 | 104 | −41 |
| Ex1bis | 0.30 | 2.16 | 7.2 | 8.91 | 13.49 | 5.73 | −1.14 | −0.4 | 23.9 | −1.8 | 106 | −41 |
| Ex1ter | 0.70 | 3.5 | 5.01 | 8.91 | 13.49 | 5.35 | −0.01 | −0.4 | 22.8 | −1.8 | 98 | −41 |
| Ex2 | 0.50 | 2.61 | 5.21 | 9.29 | 13.21 | 5.52 | −0.03 | −7.03 | 21.5 | −27.6 | 87 | −620 |
| Ex2bis | 0.30 | 1.86 | 6.19 | 9.29 | 13.21 | 5.82 | −0.48 | −7.03 | 22.4 | −27.6 | 94 | −620 |
| Ex2ter | 0.70 | 3.18 | 4.54 | 9.29 | 13.21 | 5.35 | 0.17 | −7.03 | 20.8 | −27.6 | 81 | −620 |
| Ex3 | 0.50 | 2.65 | 5.31 | 9.23 | 14.81 | 5.44 | −0.18 | −7.15 | 21.4 | −39.9 | 87 | −959 |
| Ex3bis | 0.30 | 1.91 | 6.38 | 9.23 | 14.81 | 5.69 | −0.8 | −7.15 | 21.8 | −39.9 | 90 | −959 |
| Ex3ter | 0.70 | 3.23 | 4.62 | 9.23 | 14.81 | 5.3 | 0.03 | −7.15 | 20.8 | −39.9 | 83 | −959 |

Optical fibres according to embodiments of the invention typically have the following properties:

- a ratio $r_0/r_1$ of the centre part of the core's radius to the transition part of the core's radius preferably ranging between 0.25 and 0.75;
- a central-core surface integral $V_{01}$ preferably ranging between about $19 \cdot 10^{-3}$ μm and about $25 \cdot 10^{-3}$ μm;
- a buried-trench surface integral $V_{03}$ preferably ranging between $-55 \cdot 10^{-3}$ μm and 0;
- a central-core volume integral $V_{11}$ preferably ranging between $80 \cdot 10^{-3}$ μm² and $105 \cdot 10^{-3}$ μm²;
- a buried-trench volume integral $V_{13}$ preferably ranging between $-1200 \cdot 10^{-3}$ μm² and 0.

Table 9 (below) shows optical transmission characteristics for optical fibres having the refractive-index profiles depicted in Table 8.

TABLE 9

| | MFD 1310 (μm) | MFD 1550 (μm) | FCO (nm) | CCO (nm) | ZDW (nm) | ZDS (ps/nm²-km) |
|---|---|---|---|---|---|---|
| Ex1 | 9.03 | 10.17 | 1261 | 1203 | 1316 | 0.087 |
| Ex1bis | 9.08 | 10.20 | 1254 | 1199 | 1317 | 0.089 |
| Ex1ter | 9.03 | 10.18 | 1259 | 1200 | 1316 | 0.086 |
| Ex2 | 8.76 | 9.82 | 1235 | 1182 | 1320 | 0.090 |
| Ex2bis | 8.79 | 9.85 | 1242 | 1182 | 1320 | 0.092 |
| Ex2ter | 8.77 | 9.85 | 1233 | 1182 | 1320 | 0.089 |
| Ex3 | 8.77 | 9.80 | 1375 | 1232 | 1317 | 0.091 |
| Ex3bis | 8.78 | 9.81 | 1383 | 1231 | 1317 | 0.092 |
| Ex3ter | 8.76 | 9.8 | 1371 | 1232 | 1317 | 0.090 |

Table 10 (below) shows bending losses for optical fibres having the refractive-index profiles depicted in Table 8.

TABLE 10

| | R15BL at 1550 (dB/10T) | R10BL at 1550 (dB/1T) | R7.5BL at 1550 (dB/1T) | R5BL at 1550 (dB/1T) | R15BL at 1625 (dB/10T) | R10BL at 1625 (dB/1T) | R7.5BL at 1625 (dB/1T) | R5BL at 1625 (dB/1T) |
|---|---|---|---|---|---|---|---|---|
| Ex1 | 0.022 | 0.17 | 1.3 | 9 | 0.14 | 0.54 | 3.0 | 15 |
| Ex1bis | 0.023 | 0.17 | 1.2 | 8 | 0.14 | 0.52 | 2.8 | 13 |
| Ex1ter | 0.030 | 0.22 | 1.6 | 11 | 0.19 | 0.67 | 3.5 | 17 |
| Ex2 | 0.015 | 0.036 | 0.14 | 0.43 | 0.080 | 0.11 | 0.30 | 0.77 |
| Ex2bis | 0.013 | 0.031 | 0.12 | 0.38 | 0.073 | 0.094 | 0.27 | 0.69 |
| Ex2ter | 0.018 | 0.041 | 0.15 | 0.47 | 0.099 | 0.12 | 0.33 | 0.84 |
| Ex3 | 0.0046 | 0.0086 | 0.028 | 0.080 | 0.026 | 0.026 | 0.064 | 0.16 |
| Ex3bis | 0.0053 | 0.0086 | 0.027 | 0.074 | 0.029 | 0.026 | 0.061 | 0.14 |
| Ex3ter | 0.0050 | 0.0092 | 0.030 | 0.086 | 0.028 | 0.027 | 0.069 | 0.17 |

Figure 9:
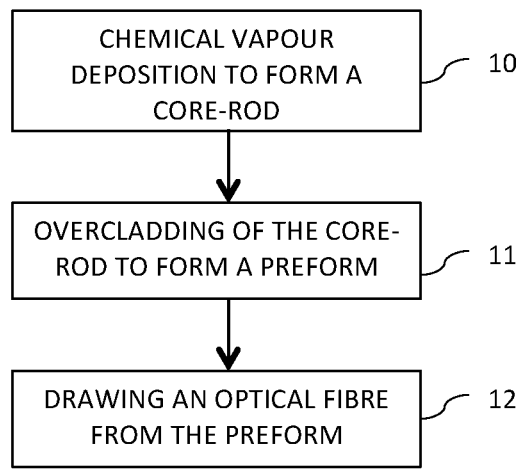
FIG. 9 illustrates an embodiment of a method for manufacturing a single mode fibre according to the invention.

FIG. 9 shows diagramatically a method of manufacturing an optical fibre comprising a first step 10 of Chemical Vapour Deposition to form a core rod. During the Chemical Vapour Deposition doped or non-doped glass layers are deposited. The deposited glass layers form the core refractive index profile of the final optical fibre and optionally the refractive index profile of the inner part of the cladding. In a second step 11 the core rod is provided with an external overcladding for increasing its diameter to form a preform. The overcladding may be derived from pre-formed silica tubes or by deposition of glass layers on the outer circumference of the core rod. Various techniques could be used for providing an overcladding by deposition of glass layers, such as Outside Vapour Deposition (OVD) or Advanced Plasma and Vapour Deposition (APVD). In a third step 12 the optical fibre is obtained by drawing the preform in a fibre drawing tower.

In order to fabricate the core-rod, a tube or substrate is generally mounted horizontally and held in a glass-making lathe. Thereafter, the tube or substrate is rotated and heated or energised locally for depositing components that determine the composition of the core-rod. Those of ordinary skill in the art will appreciate that the composition of the core-rod determines the optical characteristics of the fibre.

In this regard, both the centre part and the transition part of the core, the intermediate cladding and the trench are typically obtained using plasma chemical vapour deposition (PCVD) or furnace chemical vapour deposition (FCVD), which enable large quantities of fluorine and germanium to be incorporated into the silica and which enable a gradual change of their concentrations in the transition part of the core. The PCVD technique is for example described in patent document U.S. Re30,635 or U.S. Pat. No. 4,314,833.

Other techniques could also be used to form the core-rod, such as vapour axial deposition (VAD) or outside vapour deposition (OVD).

Optical fibres in accordance with the present invention are well suited for use in various optical communication systems, and are of particularly advantageous use, as they show reduced scattering losses due to index changes, with good Rayleigh scattering characteristics. They are particularly suited for terrestrial transmission systems, as well as for fibre-to-the-home (FTTH) systems.

Moreover, they are typically compatible with conventional optical fibres, which make them appropriate for use in many optical communication systems. For example, the optical fibres according to embodiments of the invention are typically compatible with conventional optical fibres with respect to mode field diameter, thereby facilitating good fibre-to-fibre coupling.

In the specification and/or figure, typical embodiments of the invention have been disclosed. The present invention is not limited to such exemplary embodiments.

The invention claimed is:

1. A single mode optical fibre having a core surrounded by a cladding, the core refractive index profile having a trapezoid-like shape,
   wherein said core comprises (i) a centre part having a radius $r_0$ and a refractive index no and (ii) a transition part ranging from radius $r_0$ to a radius $r_1 > r_0$, wherein $r_1$ is between 4.5 microns and 7.2 microns;
   wherein a ratio $r_0/r_1$ of said centre part's radius $r_0$ to said transition part's radius $r_1$ is between 0.25 and 0.75;
   wherein, to reduce Rayleigh scattering losses at a 1550 nm wavelength, said transition part of the trapezoid-like core refractive index profile is obtained by gradually changing a concentration of at least two dopants from a concentration in said centre part of said core to a concentration in a cladding part adjacent to said core;
   wherein said centre part of said core comprises one or more dopants inducing refractive index higher than silica and wherein said one or more dopants induce a refractive index increase of $0.6 \times 10^{-3}$ or more, wherein the concentration of said one or more dopants inducing refractive index higher than silica decreases substantially linearly across said core's transition part between radius $r_0$ and radius $r_1$; and
   wherein said cladding comprises one or more dopants inducing refractive index lower than silica and wherein said one or more dopants induce a refractive index decrease of $-0.2 \times 10^{-3}$ or less, wherein the concentration of said one or more dopants inducing refractive index lower than silica changes substantially linearly across said core's transition part between radius $r_0$ and radius $r_1$.

2. The single mode optical fibre of claim 1, wherein said cladding comprises at least one trench, a region of depressed refractive index.

3. The single mode optical fibre of claim 2,
   wherein said cladding comprises:
   an intermediate cladding ranging from radius $r_1$ to radius $r_2 > r_1$ and having a refractive index $n_2$;
   said trench ranging from radius $r_2$ to radius $r_3 > r_2$ and having a refractive index $n_3$;
   an outer cladding ranging from radius $r_3$ and having a refractive index $n_4$.

4. The single mode optical fibre of claim 3, wherein the ratio $r_0/r_1$ of said centre part of said core's radius $r_0$ to said transition part's radius $r_1$ is between 0.3 and 0.7.

5. The single mode optical fibre of claim 3, wherein said core has a surface integral $V_{01}$ of between about $19 \cdot 10^{-3}$ μm and $25 \cdot 10^{-3}$ μm, the surface integral being defined according to the following equation:

$$V_{01} = \int_0^{r_1} \Delta n(r) \cdot dr \approx \frac{\Delta n_0 \cdot (r_1 + r_0) + \Delta n_2 \cdot (r_1 - r_0)}{2},$$

where $\Delta n_0 = n_0 - n_4$ is the refractive-index difference of said centre part of said core with respect to said outer cladding, and $\Delta n_2 = n_2 - n_4$ is the refractive-index difference of said intermediate cladding with respect to said outer cladding.

6. The single mode optical fibre of claim 3, wherein said trench has a surface integral $V_{03}$ of between about $-55 \cdot 10^{-3}$ μm and 0, the surface integral $V_{03}$ being defined according to the following equation $$V_{03} = \int_{r_2}^{r_3} \Delta n(r) \cdot dr \approx (r_3 - r_2) \times \Delta n_3,$$

where $\Delta n_3 = n_3 - n_4$ is the refractive-index difference of said trench with respect to said outer cladding.

7. The single mode optical fibre of claim 3, wherein said core has a volume integral $V_{11}$ of between about $80 \cdot 10^{-3}$ μm² and $105 \cdot 10^{-3}$ μm², the volume integral $V_{11}$ being defined according to the following equation $$V_{11} = 2 \cdot \int_0^{r_1} \Delta n(r) \cdot r \cdot dr \approx \frac{\Delta n_0 \cdot (r_1^2 + r_1 \cdot r_0 + r_0^2) + \Delta n_2 \cdot (2r_1^2 - r_1 \cdot r_0 - r_0^2)}{3},$$

where $\Delta n_0 = n_0 - n_4$ is the refractive-index difference of said centre part of said core with respect to said outer cladding, and $\Delta n_2 = n_2 - n_4$ is the refractive-index difference of said intermediate cladding with respect to said outer cladding.

8. The single mode optical fibre of claim 3, wherein said trench has a volume integral $V_{13}$ of between about $-1200 \cdot 10^{-3}$ µm² and 0, the volume integral $V_{13}$ being defined according to the following equation $$V_{13} = 2 \cdot \int_{r_2}^{r_3} \Delta n(r) \cdot r dr \approx (r_3^2 - r_2^2) \times \Delta n_3,$$

where $\Delta n_3 = n_3 - n_4$ is the refractive-index difference of said trench with respect to said outer cladding.

9. The single mode optical fibre of claim 1, wherein said at least two dopants are selected from the group consisting of:
Germanium oxide;
Fluorine;
Phosphorus oxide; and
Boron oxide.

10. The single mode optical fibre of claim 1, wherein said optical fibre has a Mode Field Diameter between 8.6 µm and 9.5 µm at a 1310 nm wavelength and a maximum Cable Cut-Off Wavelength of 1260 nm.

11. A method of manufacturing the single mode optical fibre of claim 1, the core refractive index profile having a trapezoid-like shape, said method comprising a first step of Chemical Vapour Deposition to form a core-rod, followed by a second step of overcladding said core-rod to obtain a preform, followed by a third step of drawing an optical fibre from said preform,
wherein the first step of Chemical Vapour Deposition comprises a step of gradually changing a concentration of at least two dopants in said transition part from a concentration in said centre part of said core to a concentration in a cladding part adjacent to said core.

12. The method of claim 11, wherein said first step of Chemical Vapour Deposition including the step of gradually changing said concentration is carried out by introducing said dopants into a core-rod by means of a Furnace Chemical Vapour Deposition (FCVD) process or by means of a Plasma Chemical Vapour Deposition (PCVD) process.

13. Optical fibre transmission system comprising at least one single mode fibre according to claim 1.

14. The single mode optical fibre of claim 1, wherein:
said centre part of said core has a radius $r_0$ and a refractive index no of less than $6.0 \times 10^{-3}$.

15. The single mode optical fibre of claim 1,
wherein the ratio $r_0/r_1$ of said centre part of said core's radius $r_0$ to said transition part's radius $r_1$ is between 0.3 and 0.7.

16. The single mode optical fibre of claim 1, wherein said single mode optical fibre has a zero dispersion wavelength between 1300 nm and 1324 nm.

17. The single mode optical fibre of claim 1, wherein the concentration of said one or more dopants inducing refractive index lower than silica increases substantially linearly across said core's transition part between radius $r_0$ and radius $r_1$.

18. The single mode optical fibre of claim 1, wherein the concentration of said one or more dopants inducing refractive index lower than silica decreases substantially linearly across said core's transition part between radius $r_0$ and radius $r_1$.

19. The single mode optical fibre of claim 1, wherein said one or more dopants inducing refractive index higher than silica consists essentially of Germanium oxide.

20. The single mode optical fibre of claim 1, wherein said one or more dopants inducing refractive index lower than silica consists essentially of Fluorine.

* * * * *

UNITED STATES PATENT AND TRADEMARK OFFICE
CERTIFICATE OF CORRECTION

PATENT NO. : 10,295,733 B2
APPLICATION NO. : 15/105767
DATED : May 21, 2019
INVENTOR(S) : Louis-Anne de Montmorillon et al.

It is certified that error appears in the above-identified patent and that said Letters Patent is hereby corrected as shown below:

In the Claims

Claim 1, Column 19, delete Line 54 and insert: -- radius $r_0$ and a refractive index $n_0$ and (ii) a transition --

Claim 14, Column 22, delete Line 11 and insert: -- index $n_0$ of less than $6.0 \times 10^{-3}$ --

Signed and Sealed this
First Day of October, 2019

Andrei Iancu
*Director of the United States Patent and Trademark Office*